(12) United States Patent
Siomina et al.

(10) Patent No.: US 11,190,319 B2
(45) Date of Patent: Nov. 30, 2021

(54) CONTROLLING CELL-SPECIFIC REFERENCE SIGNAL (CRS) BANDWIDTH ON A LEAN CARRIER BASED ON ANOTHER REFERENCE SIGNAL BANDWIDTH

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/466,688

(22) PCT Filed: Dec. 5, 2017

(86) PCT No.: PCT/IB2017/057656
§ 371 (c)(1),
(2) Date: Jun. 5, 2019

(87) PCT Pub. No.: WO2018/104864
PCT Pub. Date: Jun. 14, 2018

(65) Prior Publication Data
US 2020/0067661 A1 Feb. 27, 2020

Related U.S. Application Data

(60) Provisional application No. 62/430,142, filed on Dec. 5, 2016.

(51) Int. Cl.
*H04W 72/12* (2009.01)
*H04L 5/00* (2006.01)
(Continued)

(52) U.S. Cl.
CPC ............ *H04L 5/005* (2013.01); *G01S 5/0036* (2013.01); *H04L 1/0026* (2013.01); *H04L 5/10* (2013.01);
(Continued)

(58) Field of Classification Search
CPC ............................ H04L 5/005; H04W 64/006
See application file for complete search history.

(56) References Cited

U.S. PATENT DOCUMENTS

2011/0230144 A1    9/2011  Siomina et al.
2012/0276916 A1* 11/2012  Kazmi ............. H04W 72/0446
455/452.1

(Continued)

FOREIGN PATENT DOCUMENTS

CN    102395187 A    3/2012
CN    103634899 A    3/2014
(Continued)

OTHER PUBLICATIONS

Russian Office Action and Search Report issued in corresponding Russian Application No. 2019120811/07(040691) dated Nov. 25, 2019, consisting of 15 pages.
(Continued)

*Primary Examiner* — Zhiren Qin
(74) *Attorney, Agent, or Firm* — Christopher & Weisberg, P.A.

(57) ABSTRACT

A method is disclosed that includes determining a presence of a first type of reference signal having a first bandwidth configuration; obtaining a second bandwidth configuration associated with a second type of reference signal, the second bandwidth configuration being based on the presence of the first type of reference signal; and controlling a bandwidth of the second type of reference signal based on the obtained second bandwidth configuration.

16 Claims, 9 Drawing Sheets

(51) Int. Cl.
  *G01S 5/00* (2006.01)
  *H04L 1/00* (2006.01)
  *H04L 5/10* (2006.01)
  *H04W 4/06* (2009.01)
  *H04W 24/10* (2009.01)
  *H04W 64/00* (2009.01)
  *H04W 72/04* (2009.01)

(52) U.S. Cl.
  CPC ............. *H04W 4/06* (2013.01); *H04W 24/10* (2013.01); *H04W 64/006* (2013.01); *H04W 72/0453* (2013.01)

(56) References Cited

U.S. PATENT DOCUMENTS

| | | |
|---|---|---|
| 2012/0294239 A1 | 11/2012 | Lindoff et al. |
| 2013/0286928 A1 | 10/2013 | Xu et al. |
| 2013/0308481 A1 | 11/2013 | Kazmi et al. |
| 2014/0254504 A1 | 9/2014 | Bashar et al. |
| 2016/0295374 A1 | 10/2016 | Persson et al. |
| 2017/0288822 A1* | 10/2017 | Lagerqvist ............ H04L 5/0007 |
| 2017/0359820 A1* | 12/2017 | Gaal ...................... H04W 8/22 |
| 2018/0013529 A1* | 1/2018 | You .......................... H04L 5/00 |
| 2018/0042025 A1* | 2/2018 | Opshaug ............. H04L 27/2613 |
| 2018/0098314 A1* | 4/2018 | Alvarino ............. H04W 72/048 |
| 2018/0139763 A1 | 5/2018 | Bitra et al. |
| 2020/0252173 A1* | 8/2020 | Lagerqvist .......... H04W 72/042 |

FOREIGN PATENT DOCUMENTS

| | | |
|---|---|---|
| CN | 103945446 A | 7/2014 |
| EP | 2997759 A1 | 11/2014 |
| EP | 3 200 412 A1 | 8/2017 |
| RU | 2 520 358 C1 | 6/2014 |
| WO | 2011/115546 A1 | 9/2011 |
| WO | 2016/032381 A1 | 3/2016 |
| WO | 2016/048055 A1 | 3/2016 |
| WO | 2016/071010 A1 | 5/2016 |

OTHER PUBLICATIONS

European Examination Report dated Jun. 12, 2020 issued in European Patent Application No. 17 822 025.7, consisting of 8 pages.
International Search Report and Written Opinion of the International Searching Authority dated Mar. 14, 2018 issued in PCT Application No. PCT/IB2017/057661, consisting of 18 pages.
International Preliminary Report on Patentability dated Jan. 7, 2019 issued in PCT Application No. PCT/IB2017/057661, consisting of 34 pages.
Ericsson, 3GPP TSG RAN WG4 Meeting #84 R4-1707711, Berlin, Germany, Aug. 21-25, 2017; Agenda Item: 8.29.1; Document for Discussion; On the Scenarios for Network-Based CRS Interference Mitigation, consisting of 4 pages.
Ericsson, 3GPP TSG-RAN WG4 Meeting #81 R4-1610351, Reno, Nevada, Nov. 14-18, 2016; Agenda Item: 13; Document for Information; New Work Item on UE Requirements for Network-Based CRS Mitigation for LTE, consisting of 7 pages.
Ericsson, 3GPP TSG RAN WG4 Meeting #81 R4-1610352, Reno, Nevada, Nov. 14-18, 2016; Agenda Item: 13, Motivation for New Work Item on Network Based CRS Mitigation, consisting of 5 pages.
Ericsson, 3GPP TSG RAN Meeting #74 RP-162286, Vienna, Austria, Dec. 5-8, 2016; Agenda Item: 10.1.1, Motivation for New WI on Even Further Enhanced MTC for LTE, consisting of 8 pages.
Huawei, HiSilicon, 3GPP TSG RAN WG1 Meeting #78b R1-143922, Ljubljana, Slovenia, Oct. 6-10, 2014 Agenda Item: 7.3.1.1.2; Document for Discussion and Decision; Coverage Enhancement for MTC UEs—Capability or Mimicry? consisting of 6 pages.
Qualcomm Incorporated, 3GPP TSG RAN WG1 Meeting #87 R1-1613255, Reno, USA, Nov. 14-18, 2016, Number of MPDCCH-PRB Sets, consisting of 8 pages.
ETSI 3GPP TS 36.213 Version 13.3.0 (Nov. 2016) Release 13, LTE; Evolved Universal Terrestrial Radio Access (E-UTRA); Physical Layer Procedures, consisting of 387 pages.
3GPP TS 36.331 V14.4.0 (Sep. 2017) 3rd Generation Partnership Project; Technical Specification Group Radio Access Network; Evolved Universal Terrestrial Radio Access (E-UTRA); Radio Resource Control (RRC); Protocol Specification (Release 14), consisting of 753 pages.
3GPP TS 36.211 V14.4.0 (Sep. 2017) 3rd Generation Partnership Project; Technical Specification Group Radio Access Network; Evolved Universal Terrestrial Radio Access (E-UTRA); Physical Channels and Modulation (Release 14), consisting of 197 pages.
International Search Report and Written Opinion of the International Searching Authority dated Feb. 27, 2018 issued in PCT Application No. PCT/IB2017/057656, consisting of 12 pages.
International Preliminary Report on Patentability dated Feb. 27, 2019 issued in PCT Application No. PCT/IB2017/057656, consisting of 31 pages.
3GPP TS 36.331 V13.0.0 (Dec. 2015) 3rd Generation Partnership Project; Technical Specification Group Radio Access Network; Evolved Universal Terrestrial Radio Access (E-UTRA) Radio Resource Control (RRC); Protocol Specification (Release 13), consisting of 507 pages.
ETSI TS 136.214 V14.3.0 (Oct. 2017) LTE; Evolved Universal Terrestrial Radio Access (E-UTRA); Physical Layer; Measurements (3GPP TS 36.214 V14.3.0 Release14), consisting of 25 pages.
ETSI TS 136.355 V14.3.0 (Oct. 2017) LTE; Evolved Universal Terrestrial Radio Access (E-UTRA); LTE Positioning Protocol (LPP) (3GPP TS 36.355 V14.3.0 Release 14), consisting of 172 pages.
ETSI TS 136.101 V14.5.0 (Nov. 2017) LTE; Evolved Universal Terrestrial Radio Access (E-UTRA); User Equipment (UE) Radio Transmission and Reception (3GPP TS 36.101 V14.5.0 Release 14), consisting of 1512 pages.
Office Action dated Dec. 12, 2019 issued in U.S. Appl. No. 16/466,805, consisting of 20 pages.
European Search Report dated Dec. 2, 2019 issued in EP Application No. 17 822 025.7, consisting of 7 pages.
Chinese Office Action, Search Report and English Summary of the Chinese Office Action and Search Report dated May 31, 2021 issued in Chinese Patent Application No. 201780085684.1, consisting of 7 pages.
Nokia, Alcatel-Lucent Shanghai Bell, R1-166589; 3GPP TSG RAN WG1 Meeting #86; Title: OTDOA Positioning in NB-IoT; Agenda Item: 7 2.11 1.3; Document for: Discussion and Decision; Gothenburg, Sweden, Aug. 22-26, 2016, consisting of 3 pages.

\* cited by examiner

CONTROLLING CELL-SPECIFIC REFERENCE SIGNAL (CRS) BANDWIDTH ON A LEAN CARRIER BASED ON ANOTHER REFERENCE SIGNAL BANDWIDTH

CROSS-REFERENCE TO RELATED APPLICATIONS

This application is a Submission Under 35 U.S.C. § 371 for U.S. National Stage Patent Application of International Application No.: PCT/IB2017/057656, filed Dec. 5, 2017 entitled "CONTROLLING CELL-SPECIFIC REFERENCE SIGNAL (CRS) BANDWIDTH ON A LEAN CARRIER BASED ON ANOTHER REFERENCE SIGNAL BANDWIDTH," which claims priority to U.S. Provisional Application No. 62/430,142, filed Dec. 5, 2016, entitled "CONTROLLING CRS BANDWIDTH ON A LEAN CARRIER BASED ON ANOTHER REFERENCE SIGNAL BANDWIDTH," the entireties of both of which are incorporated herein by reference.

TECHNICAL FIELD

Wireless communication and in particular, methods and apparatuses for controlling and/or using a cell-specific reference signal bandwidth, based on another reference signal bandwidth.

BACKGROUND

Power consumption is important for user equipments (UEs) using battery or an external power supply, and the importance of power consumption increases with the continued growth of device populations and more demanding use cases. The importance can be illustrated by the following scenarios, e.g.:

For Machine-to-Machine (M2M) use cases, such as, for example, sensors that run on a battery, a major cost is on-site exchange (or charge) of the batteries; for a large amount of M2M devices, the battery lifetime may even determine the device's lifetime if it is not foreseen or practical to charge or replace the battery;

Even for scenarios where UEs may consume power from an external power supply, it may be desirable to consume less power for energy efficiency purposes.

To facilitate power consumption in the UE, 3GPP defined Discontinuous Reception (DRX) operation for UEs in RRC_CONNECTED and RRC_IDLE, and recently also defined eDRX operation for UEs in RRC_CONNECTED and RRC_IDLE in Long-Term Evolution (LTE), as well as eDRX operation for UEs in RRC_IDLE in Universal Terrestrial Radio Access (UTRA).

To enable power consumption in eNodeBs (eNBs), a work item (WI) on network-based Cell-Specific Reference Signal (CRS) mitigation is being proposed in 3GPP in [1] R4-1610351 New Work Item on UE requirements for network-based CRS mitigation for LTE, Ericsson, November 2016 and [2] R4-1610352 Motivation for New Work Item on Network Based CRS Mitigation, Ericsson, November 2016, both publicly available at www.3GPP.org Network-Based CRS Mitigation Right from the start in Rel-8, LTE was designed to rely on Cell-specific Reference Signals (CRSs), which are transmitted using full system bandwidth and in all Downlink (DL) subframes of an LTE radio frame. CRS serves many important purposes such as cell search/mobility, time/frequency synchronization, channel estimation and radio resource management.

However, CRS is currently transmitted independently of the actual load in the network or cell and, as such, CRS causes a considerable interference floor in cellular networks. Especially in times of low and medium network load, transmitting less CRS leads to lower inter-cell interference levels, which directly results in significantly higher UE data rates. Network-based CRS mitigation is especially powerful when combined with higher order modulation, e.g., 256QAM, as the cell coverage area for higher order modulation is significantly increased. In addition, the always-on CRS transmissions require eNBs to stay 'on' all the time, whereas network-based CRS mitigation allows eNBs to conserve energy.

Removing CRSs completely, e.g., as it was done for DL License Assisted Access (LAA) using Frame Structure 3 and as it is envisioned for the 5G New Radio, would have the greatest effect, but it renders the LTE carrier non-backwards compatible. In other words, removing CRSs completely would mean that legacy UEs would not be able to use such a carrier. However, CRS can also be reduced cautiously and selectively such that legacy UEs can still be served and that inter-cell interference can be significantly reduced.

For frequency domain CRS reduction, one can distinguish between RRC IDLE and RRC CONNECTED mode operation. For supporting UEs in IDLE mode, CRS can be reduced to the inner 6 physical resource blocks (PRBs) as UEs can be configured to only use those PRBs for cell selection. However, during paging occasions, system information transmissions, and random access windows, CRS should be transmitted using full bandwidth. For supporting UEs in CONNECTED mode, CRS should be transmitted full bandwidth whenever a UE is active. But, for instance during (e)DRX sleep periods, CRS may not be needed and can be reduced.

Frequency domain CRS reduction can be accompanied by time domain CRS reduction by means of configuring Multi-Broadcast Single Frequency Network (MBSFN) subframes, which contain CRS only in 1 or 2 out of 14 Orthogonal Frequency-Division Multiplexing (OFDM) symbols.

FIG. 1 illustrates an example operation with network-based CRS mitigation, where "muted CRS" refers to using the shortened CRS bandwidth (center 6 RBs).

Reference Signals in LTE

Except Cell-Specific Reference Signals (CRSs), the following reference signals (RSs) can be currently transmitted in LTE DL:

MBSFN reference signal

UE-specific Reference Signal called Demodulation Reference Signal (DM-RS) associated with the Physical Downlink Shared Channel (PDSCH)

DeModulation Reference Signal (DM-RS) associated with Enhanced Physical Downlink Control Channel (EPDCCH) or MTC Physical Downlink Control Channel (MPDCCH) ("MTC" meaning Machine-Type Communication)

Positioning Reference Signal (PRS)

Channel State Information Reference Signal (CSI-RS)

CRS

CRS may also be used for positioning purposes, e.g., Enhanced Cell ID (E-CID) or Observed Time Difference of Arrival (OTDOA) positioning.

OTDOA positioning measurements, such as Reference Signal Time Difference (RSTD) may be performed based on CRS, PRS, or both CRS+PRS.

MBSFN RS

MBSFN reference signals are generally transmitted in the MBSFN region of the MBSFN subframes only when the Physical Multicast Channel (PMCH) is transmitted. MBSFN reference signals are transmitted on antenna port 4.

MBSFN configuration is provided by eNodeB to the UE via Radio Resource Control (RRC).

MBSFN RS may be used for Multimedia Broadcast/Multicast Service (MBMS) or for Minimization of Driver Test (MDT) measurements.

MBSFN RS may have numerology that is different from CRS in the same cell.

UE specific RS associated with PDSCH UE-specific reference signals associated with PDSCH are transmitted on antenna port(s) p=5, p=7, p=8, p=11, p=13, P={11,13} or p=7, 8, . . . , v+6, where v is the number of layers used for transmission of the PDSCH;

are present and are a valid reference for PDSCH demodulation only if the PDSCH transmission is associated with the corresponding antenna port according to clause 7.1 of 3GPP TS 36.213; and are transmitted only on the physical resource blocks upon which the corresponding PDSCH is mapped.

DM-RS Associated with EPDCCH and MPDCCH

The demodulation reference signal associated with EPDCCH/MPDCCH:

is transmitted on the same antenna port as the associated EPDCCH/MPDCCH physical resource;

is present and is a valid reference for EPDCCH/MPDCCH demodulation only if the EPDCCH/MPDCCH transmission is associated with the corresponding antenna port; and is transmitted only on the physical resource blocks upon which the corresponding EPDCCH/MPDCCH is mapped.

PRS

Positioning Reference Signal (PRS) is generally only transmitted in resource blocks in downlink subframes configured for positioning reference signal transmission. If both normal and MBSFN subframes are configured as positioning subframes within a cell, the OFDM symbols in a MBSFN subframe configured for positioning reference signal transmission shall use the same cyclic prefix as used for subframe #0. If only MBSFN subframes are configured as positioning subframes within a cell, the OFDM symbols configured for positioning reference signals in the MBSFN region of these subframes shall use extended cyclic prefix length. In a subframe configured for positioning reference signal transmission, the starting positions of the OFDM symbols configured for positioning reference signal transmission shall be identical to those in a subframe in which all OFDM symbols have the same cyclic prefix length as the OFDM symbols configured for positioning reference signal transmission.

The cell specific subframe configuration period $T_{PRS}$ and the cell specific subframe offset $\Delta_{PRS}$ for the transmission of positioning reference signals are listed in Table 1 herein below. The PRS configuration index $I_{PRS}$ is configured by higher layers. Positioning reference signals are transmitted only in configured DL subframes. Positioning reference signals shall not be transmitted in the Downlink Pilot Time Slot (DwPTS). Positioning reference signals shall be transmitted in $N_{PRS}$ consecutive downlink subframes, where $N_{PRS}$ is configured by higher layers. The positioning reference signal instances, for the first subframe of the $N_{PRS}$ downlink subframes, may satisfy $(10 \times n_f + \lfloor n_s/2 \rfloor - \Delta_{PRS}) \bmod T_{PRS} = 0$.

Several additional PRS configurations are to be introduced in 3GPP TS 36.211.

PRS configuration is provided to the UE in OTDOA assistance data via higher-layer protocol (e.g., LTE Positioning Protocol (LPP) or LLP Extension (LPPe)) by evolved Serving Mobile Location Center (E-SMLC) (a.k.a. positioning node), while the E-SMLC may obtain the PRS configuration of individual cells via LLP A (LPPa) protocol from eNodeBs.

TABLE 1

Positioning Reference Signal Subframe Configuration

| PRS configuration Index $I_{PRS}$ | PRS periodicity $T_{PRS}$ (subframes) | PRS subframe offset $\Delta_{PRS}$ (subframes) |
|---|---|---|
| 0–159 | 160 | $I_{PRS}$ |
| 160–479 | 320 | $I_{PRS} - 160$ |
| 480–1119 | 640 | $I_{PRS} - 480$ |
| 1120–2399 | 1280 | $I_{PRS} - 1120$ |
| 2400–4095 | Reserved | |

CSI-RS

CSI-RS are used, e.g., in Coordinated Multipoint (CoMP), shared cell deployments and/or distributed antenna systems to provide different antenna-specific RSs within the same cell.

CSI reference signals are transmitted on one, two, four, eight, twelve, or sixteen antenna ports using p=15, p=15, 16, p=15, . . . , 18, p=15, . . . , 22, p=15, . . . , 26 and p=15, . . . , 30, respectively.

For CSI reference signals using more than eight antenna ports, $N_{res}^{CSI} > 1$ CSI-RS configurations in the same subframe, numbered from 0 to $N_{res}^{CSI} - 1$, are aggregated to obtain $N_{res}^{CSI} N_{ports}^{CSI}$ antenna ports in total. The supported configurations of aggregated CSI-RS configurations are shown in Table 2 herein below.

CSI reference signals are defined for $\Delta f = 15$ kHz only.

TABLE 2

Aggregation of CSI-RS Configurations.

| Total number of antenna ports $N_{res}^{CSI} N_{ports}^{CSI}$ | Number of antenna ports per CSI-RS configuration $N_{ports}^{CSI}$ | Number of CSI-RS configurations $N_{res}^{CSI}$ |
|---|---|---|
| 12 | 4 | 3 |
| 16 | 8 | 2 |

Numerology in LTE and NR

For LTE, the term "numerology" includes, e.g., the following elements: frame duration, subframe or Transmission Time Interval (TTI) duration, slot duration, subcarrier spacing, cyclic prefix (CP) length, number of subcarriers per RB, number of RBs within the bandwidth (different numerologies may result in different numbers of RBs within the same bandwidth), number of symbols within a certain time unit, e.g., 1 ms subframe, symbol length, etc.

The exact values for the numerology elements in different radio access technologies are typically driven by performance targets, e.g., performance requirements impose constraints on usable subcarrier spacing sizes, e.g., the maximum acceptable phase noise sets the minimum subcarrier bandwidth while the slow decay of the spectrum (impacting filtering complexity and guard band sizes) favors smaller subcarrier bandwidth for a given carrier frequency, and the required cyclic prefix sets the maximum subcarrier bandwidth for a given carrier frequency to keep overhead low.

However, the numerology used thus far in the existing Radio Access Technologies (RATs) is rather static and typically can be trivially derived by the UE, e.g., by one-to-one mapping to RAT, frequency band, service type (e.g., MBMS), etc.

In LTE downlink, which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers. Recently, using also subcarrier spacing of 1.25 kHz has been agreed for MBSFN subframes.

The support of multiple numerologies has been agreed for New Radio (NR), which can be multiplexed in the frequency and/or time domain for the same or different UEs.

In NR, which is to be based on OFDM, multiple numerologies will be supported for general operation. A scaling approach (based on a scaling factor $2^n$, $n \in N_0$) has been considered for deriving subcarrier spacing candidates for NR. Values for subcarrier bandwidths currently being discussed include among others 3.75 kHz, 15 kHz, 30 kHz, 60 kHz. The numerology-specific slot durations can then be determined in ms based on the subcarrier spacing: subcarrier spacing of $(2^m*15)$ kHz gives exactly $\frac{1}{2}^m$ 0.5 ms for a slot that is 0.5 ms in the 15 kHz numerology.

Subcarrier spacings of at least up to 480 kHz are currently being discussed for NR (the highest discussed values correspond to millimeter-wave based technologies). It was also agreed that multiplexing different numerologies within a same NR carrier bandwidth is supported, and frequency-division multiplexing (FDM) and/or time-division multiplexing (TDM) can be considered. It was further agreed that multiple frequency/time portions using different numerologies share a synchronization signal, where the synchronization signal refers to the signal itself and the time-frequency resource used to transmit the synchronization signal. Yet, another agreement has been made that the numerology used can be selected independently of the frequency band; although it is assumed that a very low subcarrier spacing will not be used at very high carrier frequencies. In FIG. 2, some candidate carrier spacings are illustrated with respect to the frequency and cell range. In Table 1, further details are provided on corresponding time durations for some candidate carrier spacings.

SUMMARY

Embodiments of the present disclosure may improve performance of a wireless communication network. Some of the proposals, discussed herein above, to the use and/or configuration of synchronization signals may cause problems. For example, UE performance degradation may result if a CRS bandwidth is smaller than the bandwidth of another reference signal, e.g., positioning measurement accuracy may be degraded, especially if the measurements are performed on both CRS+PRS.

Thus, certain embodiments according to aspects of the present disclosure may provide solutions to this and/or other problems.

According to a first aspect of the present disclosure, methods for a controlling node (e.g., a radio network node, a core network node, BS, radio network controller, SON node, O&M node, MME, etc.) are provided. Certain embodiments of such methods may comprise the steps of:

Step 1 (optional): Indicating to at least one other node (e.g., UE or a network node) the controlling node's ability to operate according to one or more embodiments described herein;

Step 2: Determining the presence of the first type of reference signal;

Step 2a (in some embodiments): Obtaining a first bandwidth configuration associated with the first type of reference radio signal;

Step 3: Obtaining a second bandwidth configuration associated with a second type of reference radio signal, based on the result of determining the presence of the first type of reference signal;

Step 3a (in some embodiments): The obtaining of the second bandwidth configuration may be based on the first obtained bandwidth configuration;

Step 4: Controlling bandwidth of the second type of reference radio signals, based on the obtained second bandwidth configuration; and Step 5 (optional): Informing at least one other node (e.g., UE or another network node) about the obtained second bandwidth configuration.

According to a second aspect of the present disclosure, methods for a measuring node (e.g., UE or a radio network node, etc.), are provided. Certain embodiments of such methods comprise the steps of:

Step 6 (optional): Indicating to at least one other node (e.g., another UE or a network node, positioning node) the measuring node's ability to operate according to one or more embodiments described herein Step 7: Determining the presence of the first type of reference signals;

Step 7a (in some embodiments): Obtaining a first bandwidth configuration associated with a first type of reference radio signals;

Step 8: Obtaining a second bandwidth configuration associated with a second type of reference radio signals, based on the result of determining of presence of the first type of reference signals;

Step 8a (in some embodiments): The obtaining of the second bandwidth configuration may be based on the first obtained bandwidth configuration;

Step 9: Performing one or more operational tasks, based on the obtained second bandwidth configuration;

Step 9a (optional): Sending to another node (e.g., network node, BS, positioning node) a result of the one or more operational tasks; and Step 10 (optional): Informing at least one other node (e.g., UE or another network node) about the obtained second bandwidth configuration.

The order of steps in some of the above embodiments may be different.

Certain embodiments according to aspects of the present disclosure may provide one or more of the following technical advantages: the possibility to control power saving in the network while ensuring no performance degradation associated with a difference between the CRS bandwidth and the bandwidth of another reference signal. Certain embodiments may have all, some, or none of these advantages.

Other advantages will be apparent to persons of ordinary skill in the art.

Some embodiments advantageously provide methods and apparatuses for controlling and/or using a CRS bandwidth based on another reference signal bandwidth.

According to one aspect of the present disclosure, a method for a controlling node is provided that includes determining a presence of a first type of reference signal having a first bandwidth configuration; obtaining a second bandwidth configuration associated with a second type of reference signal, the second bandwidth configuration being based on the presence of the first type of reference signal; and controlling a bandwidth of the second type of reference signal based on the obtained second bandwidth configuration.

According to this aspect, in some embodiments, the first type of reference signal is of reference signal type that is different from the second type of reference signal. In some embodiments, controlling the bandwidth of the second type of reference signal includes informing at least one other node of the obtained second bandwidth configuration associated with the second type of reference signal. In some embodiments, the obtained second bandwidth configuration is based on the first bandwidth configuration. In some embodiments, obtaining a second bandwidth configuration includes using a first bandwidth value for the second type of reference signal if the presence of the first type of reference signal is not detected and, as a result of detecting the presence of the first type of reference signal, using a second bandwidth value for the second type of reference signal, the second bandwidth value being different from the first bandwidth value. In some embodiments, controlling the bandwidth of the second type of reference signal based on the obtained second bandwidth configuration includes configuring the bandwidth of the second type of reference signal based on a bandwidth of the first type of reference signal as a result of the first type of reference signal and the second type of reference signal being configured for transmission in at least part of the same time resource. In some embodiments, the method further includes at least one of indicating to at least one other node the controlling node's ability to control the bandwidth of the second type of reference signal based on the presence of the first type of reference signal; and obtaining the first bandwidth configuration of the first type of reference signal. In some embodiments, the controlling node is one of a base station and a positioning node. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to a second aspect of the present disclosure, a method for a measuring node is provided that includes determining a presence of a first type of reference signal having a first bandwidth configuration; obtaining a second bandwidth configuration associated with a second type of reference signal, the second bandwidth configuration being based on the presence of the first type of reference signal; and performing at least one operational task based on the obtained second bandwidth configuration.

According to this aspect, in some embodiments, the first type of reference signal is of reference signal type that is different from the second type of reference signal. In some embodiments, the method further includes performing at least one operational task by, for example, measuring at least one of the first type of reference signal and the second type of reference signal. In some embodiments, the obtained second bandwidth configuration is based on the first bandwidth configuration. In some embodiments, the obtained second bandwidth configuration uses a first bandwidth value for the second type of reference signal if the presence of the first type of reference signal is not detected and uses a second bandwidth value for the second type of reference signal if the presence of the first type of reference signal is detected, the second bandwidth value being different from the first bandwidth value. In some embodiments, the method further includes at least one of indicating to at least one other node the measuring node's ability to obtain the second bandwidth configuration and perform the at least one operational task based on the obtained second bandwidth configuration; obtaining the first bandwidth configuration of the first type of reference signal; sending a result of the performance of the at least one operational task to at least one other node; and informing at least one other node of the obtained second bandwidth configuration. In some embodiments, the measuring node is a user equipment. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a controlling node is provided that includes circuitry, the circuitry configured to: determine a presence of a first type of reference signal having a first bandwidth configuration; obtain a second bandwidth configuration associated with a second type of reference signal, the second bandwidth configuration being based on the presence of the first type of reference signal; and control a bandwidth of the second type of reference signal based on the obtained second bandwidth configuration.

According to this aspect, in some embodiments, the first type of reference signal is of reference signal type that is different from the second type of reference signal. In some embodiments, the circuitry is further configured to control the bandwidth of the second type of reference signal by informing at least one other node of the obtained second bandwidth configuration associated with the second type of reference signal. In some embodiments, the obtained second bandwidth configuration is based on the first bandwidth configuration. In some embodiments, the circuitry is further configured to obtain a second bandwidth configuration by using a first bandwidth value for the second type of reference signal if the presence of the first type of reference signal is not detected and, as a result of detecting the presence of the first type of reference signal, using a second bandwidth value for the second type of reference signal, the second bandwidth value being different from the first bandwidth value. In some embodiments, the circuitry is further configured to control the bandwidth of the second type of reference signal by configuring the bandwidth of the second type of reference signal based on a bandwidth of the first type of reference signal as a result of the first type of reference signal and the second type of reference signal being configured for transmission in at least part of the same time resource. In some embodiments, the circuitry is further configured to at least one of: indicate to at least one other node the controlling node's ability to control the bandwidth of the second type of reference signal based on the presence of the first type of reference signal; and obtain the first bandwidth configuration of the first type of reference signal. In some embodiments, the controlling node is one of a base station and a positioning node. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to yet another aspect of the present disclosure, a measuring node is provided that includes circuitry, the circuitry configured to: determine a presence of a first type of reference signal having a first bandwidth configuration;

obtain a second bandwidth configuration associated with a second type of reference signal, the second bandwidth configuration being based on the presence of the first type of reference signal; and perform at least one operational task based on the obtained second bandwidth configuration.

According to this aspect, in some embodiments, the first type of reference signal is of reference signal type that is different from the second type of reference signal. In some embodiments, the circuitry is further configured to perform at least one operational task by, for example, measuring at least one of the first type of reference signal and the second type of reference signal. In some embodiments, the obtained second bandwidth configuration is based on the first bandwidth configuration. In some embodiments, the obtained second bandwidth configuration uses a first bandwidth value for the second type of reference signal if the presence of the first type of reference signal is not detected and uses a second bandwidth value for the second type of reference signal if the presence of the first type of reference signal is detected, the second bandwidth value being different from the first bandwidth value. In some embodiments, the circuitry is further configured to at least one of: indicate to at least one other node the measuring node's ability to obtain the second bandwidth configuration and perform the at least one operational task based on the obtained second bandwidth configuration; obtain the first bandwidth configuration of the first type of reference signal; send a result of the performance of the at least one operational task to at least one other node; and inform at least one other node of the obtained second bandwidth configuration. In some embodiments, the measuring node is a user equipment. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a controlling node is provided that includes a determining module configured to determine a presence of a first type of reference signal having a first bandwidth configuration; an obtaining module configured to obtain a second bandwidth configuration associated with a second type of reference signal, the second bandwidth configuration being based on the presence of the first type of reference signal; and a controlling module configured to control a bandwidth of the second type of reference signal based on the obtained second bandwidth configuration.

According to yet another aspect of the present disclosure, a measuring node is provided that includes a determining module configured to determine a presence of a first type of reference signal having a first bandwidth configuration; an obtaining module configured to obtain a second bandwidth configuration associated with a second type of reference signal, the second bandwidth configuration being based on the presence of the first type of reference signal; and a performing module configured to perform at least one operational task based on the obtained second bandwidth configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
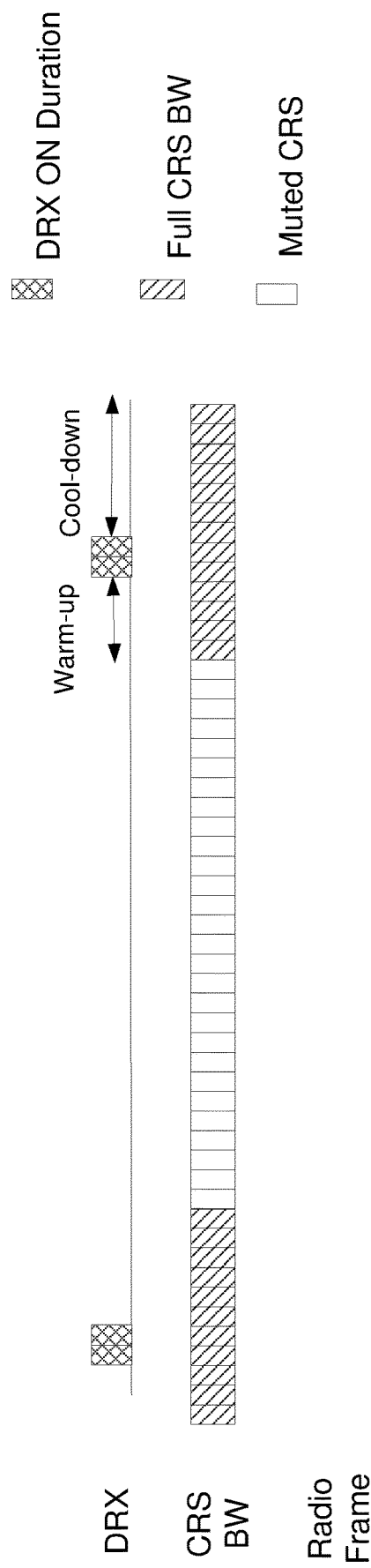
FIG. 1 illustrates an example operation with network-based CRS mitigation.
Figure 2:
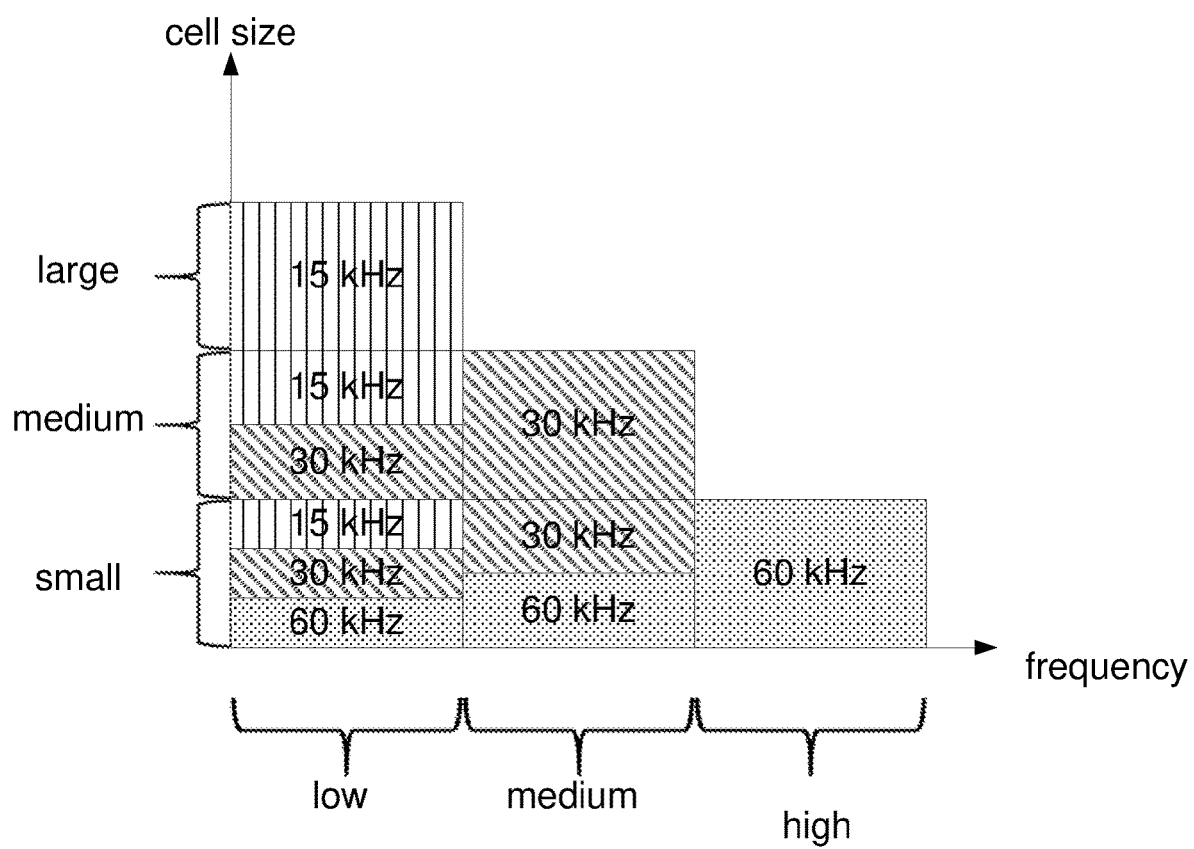
FIG. 2 illustrates example subcarrier spacing candidate configuration for NR.

Before describing in detail exemplary embodiments, it is noted that the embodiments reside primarily in combinations of apparatus components and processing steps related to controlling and/or using a CRS bandwidth based on a bandwidth of another reference signal. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Any two or more embodiments described in this document may be combined in any way with each other. Furthermore, even though the examples herein may be given in the LAA context, the embodiments described herein are not limited to LAA and can also apply in a more general case when the UE may need to configure measurement period adaptively to one or more conditions, e.g., channel quality, Ês/Iot, Signal-to-Interference-and-Noise Ratio (SINR), received signal quality, total interference or interference on a specific resource or from a specific interferer(s), etc. Other non-limiting examples where the described herein methods are particularly beneficial include measurements for DRX or extended-DRX (eDRX), and measurements in high speed train environments.

In some embodiments, a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node" is used. It can be any kind of network node which may comprise of a radio network node such as base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g., interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "measurement" herein refers to radio measurements. Some examples of the radio measurements are: signal strength or signal power measurements (e.g., Reference Signal Received Power (RSRP) or CSI-RSRP), signal quality measurements (e.g., Reference Signal Received Quality (RSRQ), SINR, RS-SINR), timing measurements (e.g., Rx-Tx, RSTD, Round Trip Time (RTT), Time of Arrival (TOA)), radio link monitoring measurements (RLM), cell detection, cell identification, cell (re)selection, CSI, Precoder Matrix Indicator (PMI), and Channel Quality Information (CQI) measurements, system information reading, etc. The measurements may be absolute or relative (e.g., absolute RSRP and relative RSRP). The measurements may be performed for one or more different purpose, e.g., Radio Resource Management (RRM), Self-Optimized Network (SON), positioning, MDT, etc. The measurements may be, e.g., intra-frequency measurements, inter-frequency measurements, inter-RAT measurements, or CA measurements. The measurements may be performed in the licensed and/or unlicensed spectrum.

The term time resource used herein may correspond to any type of physical resource or radio resource expressed in terms of length of time. Examples of time resources are: symbol, time slot, subframe, radio frame, TTI, interleaving time, hyper SFN (H-SFN), etc.

In some embodiments a term bandwidth (BW) is used. Over the BW the network node transmits to and/or receives signal from one or more UEs in a cell. The bandwidth is interchangeably called as operating BW, channel bandwidth, system bandwidth, transmission bandwidth, cell bandwidth, cell transmission BW, carrier bandwidth, measurement bandwidth, maximum allowed measurement bandwidth, common bandwidth of plurality of cells on a carrier, etc. The BW may also correspond to BW of specific signals (e.g., BW of any of: Sounding Reference Signal (SRS), CRS, Demodulation Reference Signal (DMRS), synchronization signal, data channel, control channel, etc.). The BW may be expressed in different units. Examples of units are KHz, MHz, number of resource blocks, number of resource elements, number of subcarriers, number of physical channels, number of frequency resource units, etc. The frequency channel or carrier frequency over which a RAT operates is enumerated or addressed by a channel number aka absolute radio frequency channel number (ARFCN), e.g., E-UTRA ARFCN (EARFCN) in LTE, etc. In cases where a signal is transmitted in a number of discontinuous in frequency RBs, the term bandwidth may also comprise the total span of all RBs of the signal.

The embodiments described herein may apply to any RAT or their evolution, e.g., LTE FDD, LTE TDD, UTRA, Global System for Mobile Communication (GSM), WiFi, short-range communication RAT, narrow band RAT, RAT for 5G, etc.

The terms "optional" and "in some embodiments" are both used to reflect optional, alternative features of various embodiments of aspect of the present disclosure.

Figure 3:
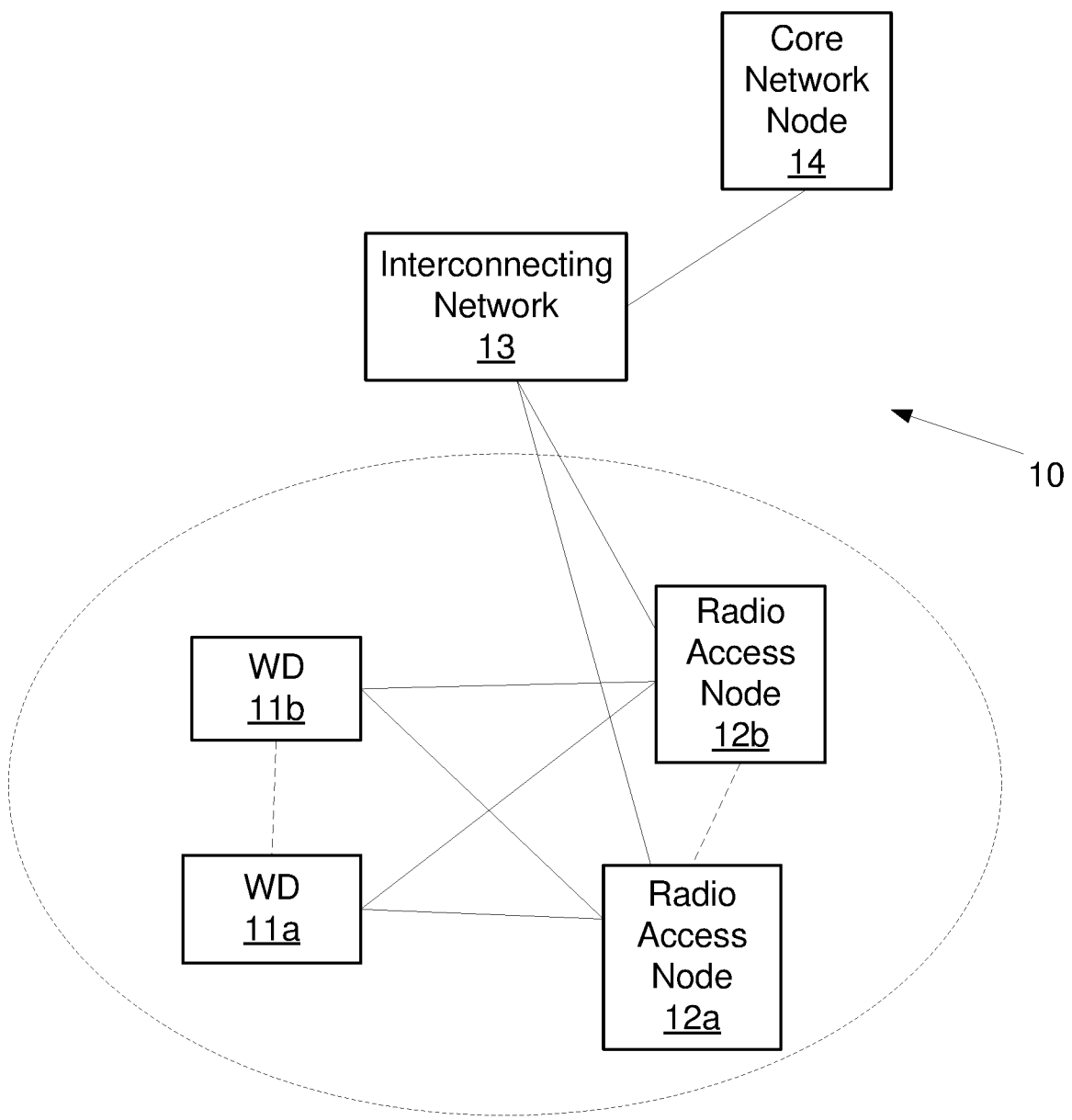
FIG. 3 illustrates an example of a wireless network that may be used for wireless communications according to embodiments of the present disclosure.

Referring now to the drawing figures in which like reference designators refer to like elements, FIG. 3 illustrates an example of a wireless network 10 that may be used for wireless communications according to the principles in the present disclosure. Wireless network 10 includes wireless devices 11a-11b (e.g., user equipment's, UEs) (referred to collectively as wireless device(s) 11 or WD(s) 11) and a plurality of radio access nodes 12a-12b (e.g., eNBs, gNBs, etc.) (referred to collective as radio access node(s) 12) connected to one or more core network nodes 14 via an interconnecting network 13. The network 10 may use any suitable deployment scenarios, such as the non-centralized, co-sited, centralized, or shared deployment scenarios. Wireless devices 11 within a coverage area may each be capable of communicating directly with radio access nodes 12 over a wireless interface. In certain embodiments, wireless devices 11 may also be capable of communicating with each other via device-to-device (D2D) communication. In certain embodiments, radio access nodes 12 may also be capable of communicating with each other, e.g. via an interface (e.g., X2 in LTE or other suitable means or interface or communication protocol).

As an example, the wireless device 11a may communicate with the radio access node 12a over a wireless interface. That is, wireless device 11a may transmit wireless signals and/or receive wireless signals from radio access node 12a. The wireless signals may contain voice traffic, data traffic, control signals, and/or any other suitable information. In some embodiments, an area of wireless signal coverage associated with a radio access node 12 may be referred to as a cell.

In some embodiments, wireless device 11 may be interchangeably referred to by the non-limiting term user equipment (UE). Wireless device 11 can be any type of wireless device capable of communicating with network node or another UE over radio signals. The UE 11 may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of wireless device 11 are described in more detail below with respect to FIGS. 5 and 7.

In some embodiments, generic terminology "network node" is used. It can be any kind of network node which may comprise of a radio network node such as radio access node 12 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise test equipment. Example embodiments of radio access node 12 are described in more detail below with respect to FIGS. 4 and 6.

The term "radio node" may be used to denote a UE (e.g., wireless device 11) or a radio network node (e.g., radio access node 12).

Figure 4:
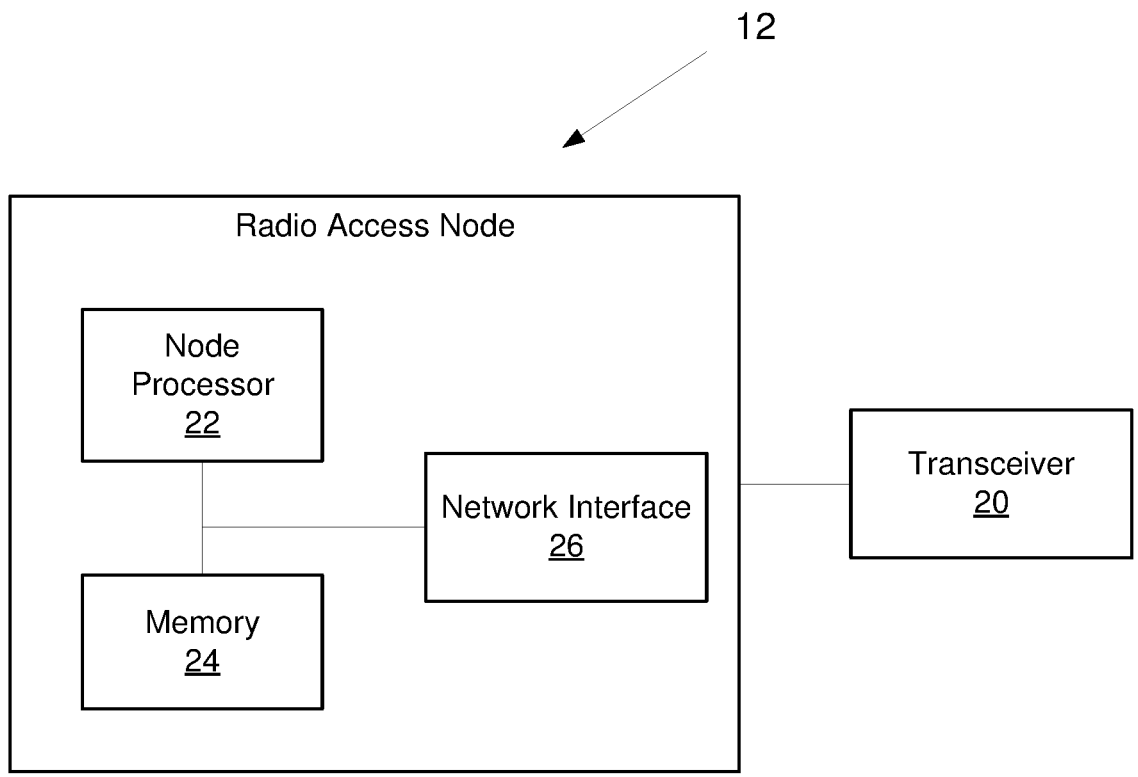
FIG. 4 is a block diagram of an exemplary radio access node according to embodiments of the present disclosure.

FIG. 4 is a block diagram of an exemplary radio access node 12, in accordance with certain embodiments. Radio access node 12 includes circuitry. The circuitry may include one or more of a transceiver 20, one or more processors 22, memory 24, and network interface 26. In some embodiments, the transceiver 20 facilitates transmitting wireless signals to and receiving wireless signals from wireless device 11 (e.g., via an antenna); the one or more processors 22 may execute instructions to provide some or all of the functionalities described herein as being provided by a radio access node 12; the memory 24 may store the instructions for execution by the one or more processors 22; and the network interface 26 may communicate signals to backend network components, such as a gateway, switch, router, Internet, Public Switched Telephone Network (PSTN), core network nodes or radio network controllers, etc.

The one or more processors 22 may include any suitable combination of hardware and software implemented in one or more modules to execute instructions and manipulate data to perform some or all of the described functions of radio access node 12, such as those described herein below. In some embodiments, the one or more processors 22 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 22 may comprise one or more of the modules discussed below with respect to FIGS. 6 and 7.

The memory 24 is generally operable to store instructions, such as a computer program, software, an application including one or more of logic, rules, algorithms, code, tables, etc. and/or other instructions capable of being executed by one or more processors. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 26 is communicatively coupled to the processor 22 and may refer to any suitable device operable to receive input for radio access node 12, send output from radio access node 12, perform suitable processing of the input or output or both, communicate to other devices, or any combination of the preceding. The network interface 26 may include appropriate hardware (e.g., port, modem, network interface card, etc.) and software, including protocol conversion and data processing capabilities, to communicate through a network.

Other embodiments of radio access node 12 may include additional components beyond those shown in FIG. 4 that may be responsible for providing certain aspects of the radio network node's functionality, including any of the functionality described herein and/or any additional functionality (including any functionality necessary to support the solutions described herein). The various different types of network nodes may include components having the same physical hardware but configured (e.g., via programming) to support different radio access technologies, or may represent partly or entirely different physical components.

Figure 5:
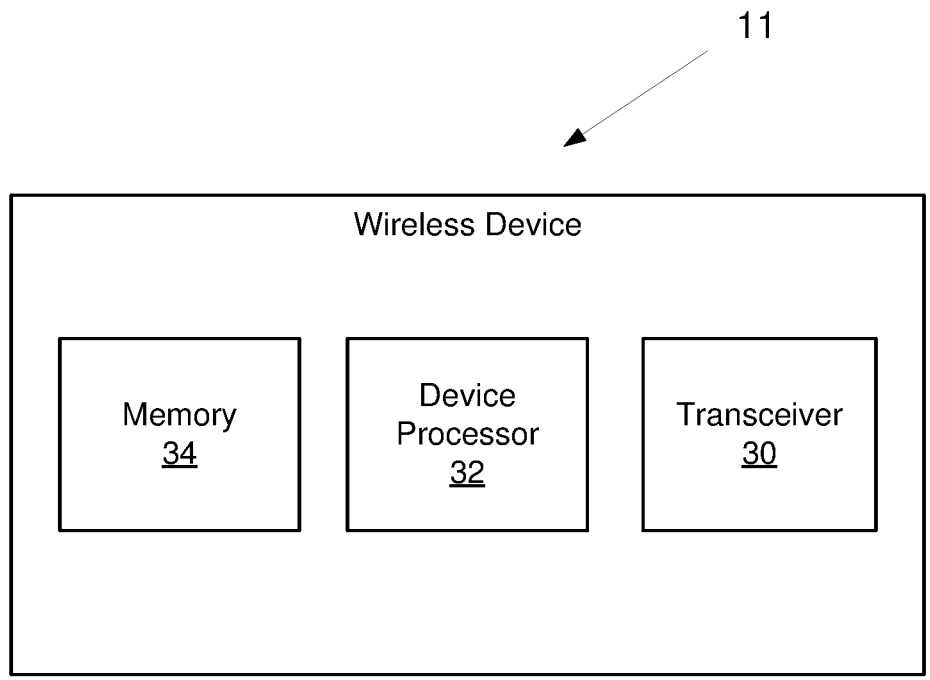
FIG. 5 is a block diagram of an exemplary wireless device according to embodiments of the present disclosure.

FIG. 5 is a block diagram of an exemplary wireless device 11, in accordance with certain embodiments. Wireless device 11 includes circuitry. The circuitry includes a transceiver 30, one or more processors 32 (only one shown), and memory 34. In some embodiments, the transceiver 30 facilitates transmitting wireless signals to and receiving wireless signals from radio access node 12 (e.g., via an antenna); the one or more processors 32 execute instructions to provide some or all of the functionalities described herein as being provided by wireless device 11, and the memory 34 stores the instructions for execution by the one or more processors 32.

The processor 32 may include any suitable combination of hardware and software implemented in one or more modules to execute instructions and manipulate data to perform some or all of the described functions of wireless device 11, such as the functions of wireless device 11 described herein below. In some embodiments, the processor 32 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor 32 may comprise one or more of the modules discussed below with respect to FIGS. 6 and 7.

The memory 34 is generally operable to store instructions, such as a computer program, software, an application including one or more of logic, rules, algorithms, code, tables, etc. and/or other instructions capable of being executed by one or more processors 32. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 32 of wireless device 11.

Other embodiments of wireless device 11 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 11 may include input devices and circuits, output devices, and one or more synchronization units or circuits, which may be part of the one or more processors 32. Input devices include mechanisms for entry of data into wireless device 11. For example, input devices may include input mechanisms, such as a microphone, input elements, a display, etc. Output devices may include mechanisms for outputting data in audio, video and/or hard copy format. For example, output devices may include a speaker, a display, etc.

Processors, interfaces, and memory similar to those described with respect to FIGS. 4 and 5 may be included in other network nodes (such as core network node 14). Other network nodes may optionally include or not include a wireless interface (such as the transceivers 20 and 30 described in FIGS. 4 and 5). Functionalities described may reside within the same radio node and networks node or may be distributed across a plurality of radios nodes and network nodes.

Figure 6:
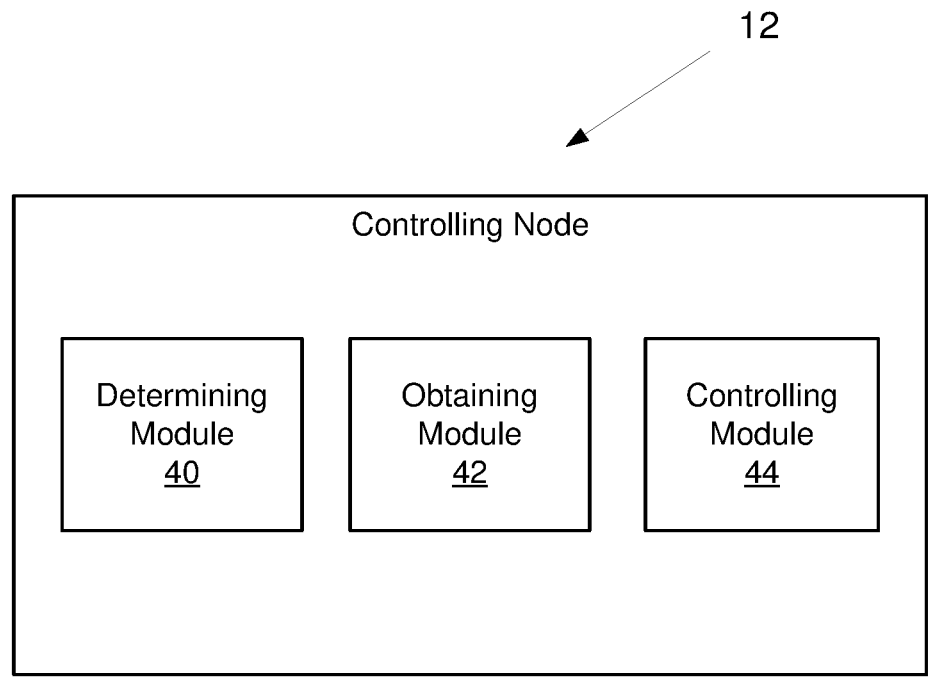
FIG. 6 is a block diagram of an alternative radio access node according to embodiments of the present disclosure.

FIG. 6 illustrates an example of a controlling node (e.g., radio access node 12), in accordance with certain embodiments. For clarity, the controlling node is indicated as 12; although it should be understood that some embodiments of the controlling node may be configured differently or have different or additional components than those depicted in the exemplary radio access node 12 shown in FIG. 4. The controlling node 12 may include a determining module 40, an obtaining module 42, and a controlling module 44.

In certain embodiments, the determining module 40 may perform a combination of steps that may include steps such as Steps 1 and 2 summarized herein above and described in more detail herein below with reference to FIG. 8.

In certain embodiments, the adaptively obtaining module 42 may perform a combination of steps that may include steps such as Step 3 summarized herein above and described in more detail herein below with reference to FIG. 8.

In certain embodiments, the controlling module 44 may perform a combination of steps that may include steps such as Steps 4 and 5 summarized herein above and described in more detail herein below with reference to FIG. 8.

In certain embodiments, the modules in FIG. 6 may be implemented using one or more processors, such as the one or more processors 22 and/or 32 described with respect to FIG. 4 or 5. The modules may be integrated or separated in any manner suitable for performing the described functionality.

Figure 7:
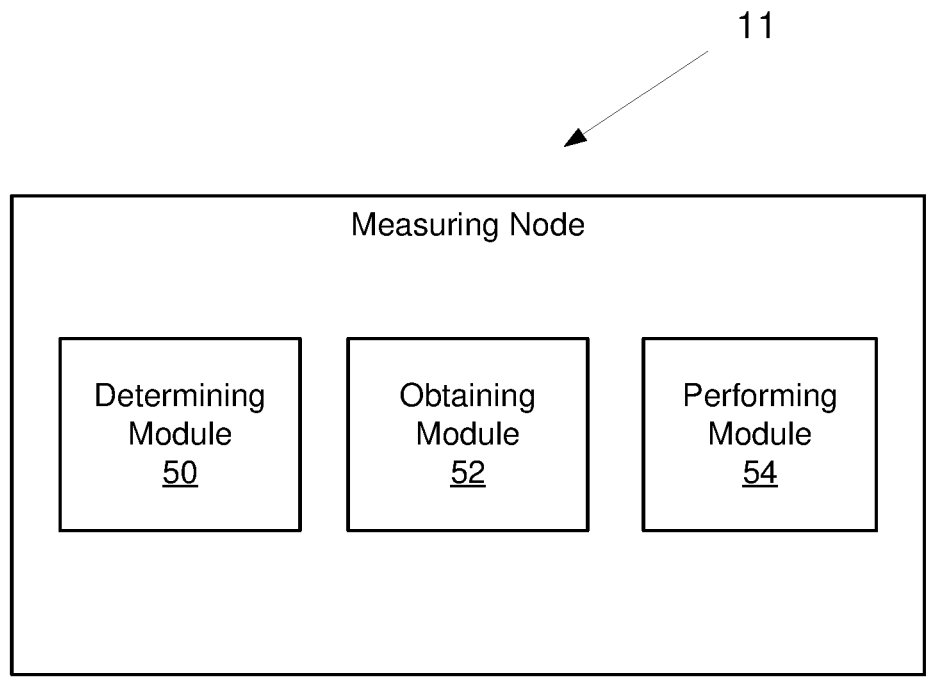
FIG. 7 is a block diagram of an alternative wireless device according to embodiments of the present disclosure.

FIG. 7 illustrates an example of a measuring node (e.g., wireless device 11) or other radio node, in accordance with certain embodiments. For clarity, the measuring node is indicated as 11; although it should be understood that some embodiments of the measuring node may be configured differently or have different or additional components than those depicted in the exemplary wireless device 11 shown in FIG. 4. The measuring node 11 may include a determining module 50, an obtaining module 52, and a performing module 54.

In certain embodiments, the determining module 50 may perform a combination of steps that may include steps such as Steps 6, 7, and/or 7a, summarized herein above and described in more detail herein below with reference to FIG. 9.

In certain embodiments, the obtaining module 52 may perform a combination of steps that may include steps such as Step 8 summarized herein above and described in more detail herein below with reference to FIG. 9.

In certain embodiments, the performing module 54 may perform a combination of steps that may include steps such as Steps 9, and/or 10 summarized herein above and described in more detail herein below with reference to FIG. 9.

In certain embodiments, the modules may be implemented using one or more processors, such as the one or more processors 22 and/or 32 described with respect to FIG. 4 or 5. The modules may be integrated or separated in any manner suitable for performing the described functionality.

Having generally described some embodiments of the present disclosure, a more detailed description of embodiments associated with methods for a controlling node 12 according to a first aspect of the present disclosure will now be described.

Figure 8:
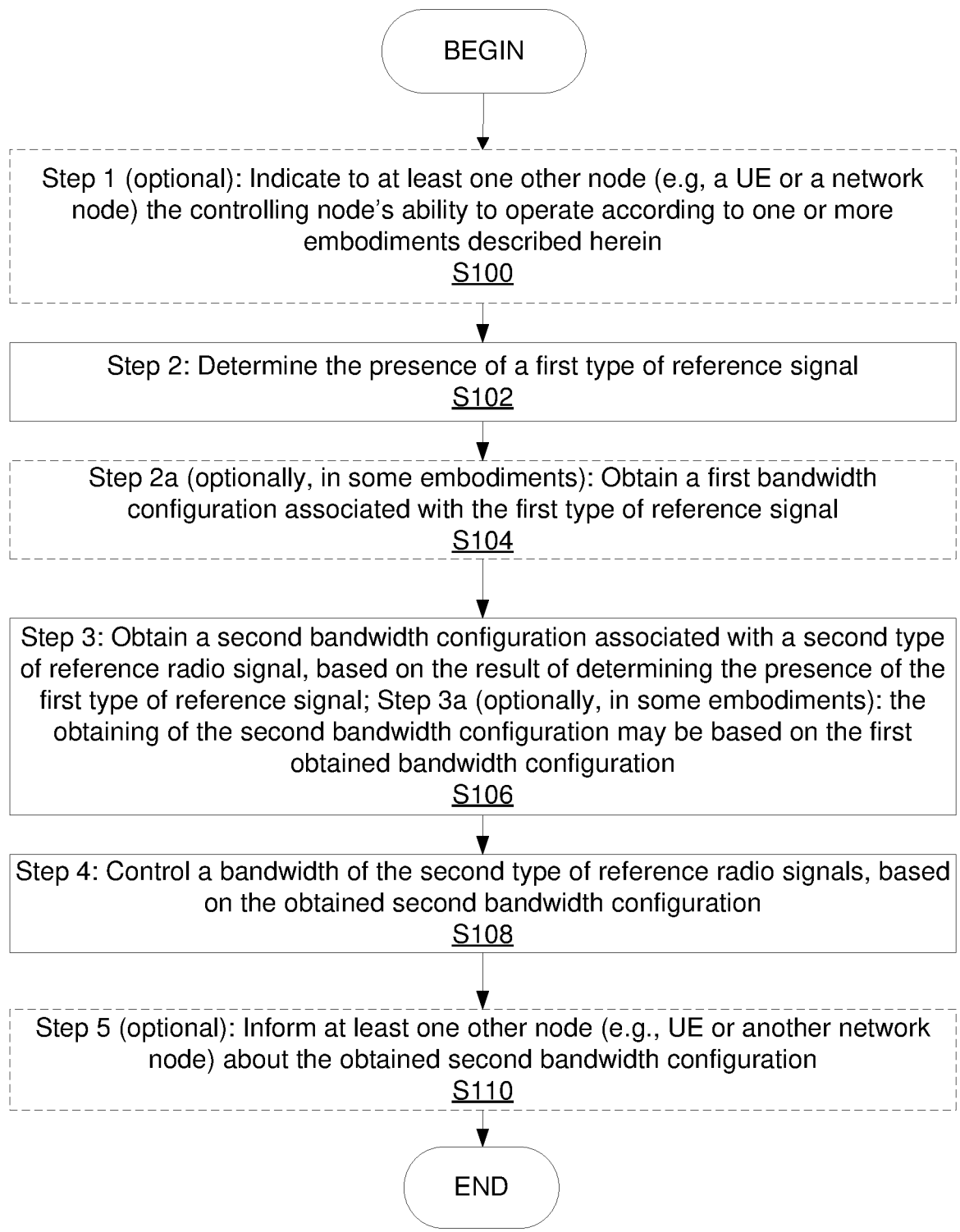
FIG. 8 is a flowchart illustrating an exemplary method for a controlling node according to embodiments of the present disclosure.

Examples of embodiments of methods for a controlling node 12 (e.g., a radio network node 12, a core network node, BS, radio network controller, SON node, O&M node, MME, etc.) according to certain embodiments of a first aspect of the disclosure are illustrated in FIG. 8.

Referring now primarily to FIG. 8, examples of embodiments of such methods may comprise:

Step 1 (optional): Indicating to at least one other node (e.g., UE 11 or a network node) the controlling node's 12 ability to operate according to one or more embodiments described herein (block S100);

Step 2: Determining the presence of the first type of reference signals (block S102);

Step 2a (in some embodiments): Obtaining a first bandwidth configuration associated with a first type of reference radio signal (block S104);

Step 3: Obtaining a second bandwidth configuration associated with a second type of reference radio signals, based on the result of determining of presence of the first type of reference signal (block S106);

Step 3a (in some embodiments): The obtaining of the second bandwidth configuration may be based on the first obtained bandwidth configuration;

Step 4: Controlling bandwidth of the second type of reference radio signals, based on the obtained second bandwidth configuration (block S108); and Step 5 (optional): Informing at least one other node (e.g., UE or another network node) about the obtained second bandwidth configuration (block S108).

Additional details on the above steps, according to various embodiments are presented next:

Step 1

In this step, the controlling node 12 may indicate to at least one other node (e.g., UE 11 or a network node) the controlling node's 12 ability to operate according to one or more embodiments described herein (block S100).

In one further example, the indication may comprise an indication of the node's 12 ability to control the second bandwidth configuration (e.g., transmission bandwidth for CRS), while ensuring that it is possible for UEs 11 receiving CRS to meet one or more performance requirements or targets.

The indication may be via a radio interface or a fixed interface (e.g., X2). The indication may be via higher-layer signaling (e.g., RRC, LPP, or system information) and/or physical layer signaling (e.g., PDCCH). The indication may be via dedicated channel, multi-cast, or broadcast.

The indication may be sent upon a request from another node or in an unsolicited way, upon a triggering condition or event.

The indication may also be indicative of one or more bandwidth configurations which are possible to select from for the second bandwidth configuration.

The indication may also be indicative of time and/or frequency resources associated with the second bandwidth configuration.

Step 2

In this step, the controlling node 12 may determine the presence of the first type of reference signals (block S102). In some examples, the determining may further comprise determining time and/or frequency resources (e.g., subframes on a carrier frequency) in which the first type of reference signals are present.

In some embodiments, the controlling node 12 may further obtain a first bandwidth configuration (e.g., at least one parameter characterizing the bandwidth; see herein above for the term "bandwidth") associated with a first type of reference radio signals (block S104).

Examples of the first type of reference signals include: PRS, MBSFN RS, CSI-RS, etc. In one example, the reference signals may be cell-specific or TP-specific (Transmission Point specific) or TRP-specific (Transmit/Receive Point specific) or UE specific.

The obtaining may be based, e.g., on one or more of:
- system bandwidth (e.g., RS use full bandwidth which depends then on the system bandwidth);
- pre-defined value or table of values;
- pre-defined rule or requirement (e.g., the minimum BW for PRS may be 10 MHz in certain scenarios or for a certain number (1) of consecutive PRS subframes or it may be 1.4 MHz with 6 consecutive PRS subframes);
- UE requirement(s) for measurements performed based on one or both of the first type of reference signals and the second type of reference signals;
- Pre-configuration or stored configuration;
- Current configuration of the first type of reference signals;
- Numerology (NUM1) used by the first type of reference signals;
- Numerology (NUM2) used by the second type of reference signals;
- Number of RBs (in frequency) for the first type of reference signals;
- Message from another node (e.g., UE 11, BS, core network node, etc.); and
- Historical data or statistics e.g. bandwidth used in the past.

In a further embodiment, the obtaining may also comprise controlling or adapting at least one other parameter (e.g., RS periodicity or number of consecutive subframes per positioning occasion) in order to enable a smaller second bandwidth of the second type of reference signals (e.g., CRS), accounting for the relation between the first bandwidth of the first type of reference signals and the second bandwidth of the second type of reference signals, and the relation between the other parameter and the first bandwidth. For example: PRS configuration may be configured with 6 consecutive subframes within a PRS occasion to allow for 1.4 MHz BW of PRS and hereby enable 1.4 MHz BW of CRS if the PRS BW should not exceed the CRS BW.

In a further embodiment, the obtaining may further account for whether and/or when and/or how frequent the first type of reference signals are transmitted. For example, if the first type of reference signals are transmitted on demand or in certain conditions or upon a certain trigger, the obtaining may further comprise determining whether there is such demand, condition or trigger, e.g., whether there is at least one UE 11 in an area (cell, tracking area, physical area, building, etc.) configured for measurements based on PRS, or whether there are still UEs 11 in the cell configured with UE-specific RS (which may be the first type of reference signals) whether the periodicity of the first type of reference signals is below a first threshold and/or above a second threshold.

Step 3

In this step, the controlling node 12 may obtain a second bandwidth configuration (BW2) associated with a second type of reference radio signals, based on the result of determining of presence of the first type of reference signals (block S106).

In one example, if the first type of reference signals are present on a carrier, BW2_2 (e.g., full bandwidth) may be used for the second type of reference signals (e.g., CRS), otherwise BW2_1 (e.g., a smaller CRS bandwidth) may be used at least in some time resources.

For example, BW2_1 may be, e.g., the smallest supported bandwidth, e.g., 1.4 MHz or 6 RBs, or it may be 0 (i.e., no transmissions) or it may be another value derived according to another rule not accounting for the presence of the first type of reference signals. For example, BW2_2 may be full bandwidth or the maximum supported bandwidth, or a bandwidth larger than BW2_1, it may depend on BW2_1 (see the corresponding embodiments below).

In another example, if the first type of reference signals are present on a carrier, BW2_2 (e.g., full bandwidth) may be used for the second type of reference signals (e.g., CRS) in time resources R, otherwise BW2_1 (e.g., a smaller CRS bandwidth) may be used at least in some time resources. For example, R may comprise:
- any subframe with transmitted second type of reference signals; and/or
- subframes with transmitted both the first type of reference signals (e.g., MBSFN subframes with MBSFN RS or positioning subframes with PRS) and the second types of reference signals.

In some embodiments, the obtaining of the second bandwidth configuration may be further based on the first obtained bandwidth configuration (e.g., BW1), which may correspond to Step 3a.

In another example, the obtaining may be based on UE requirement(s) associated with bandwidth(s) for measurements performed based on one or both of the first type of reference signals and the second type of reference signals. A larger bandwidth may generally give a better accuracy and/or requires less time and/or measurement occasions/samples for measurements.

The obtaining may be based, e.g., on one or more of a:
- Pre-defined rule;
- Function;
- Requirement;
- Presence in an area (e.g., cell, neighbor cells, tracking area, physical area, building, etc.) of at least number N (e.g., N=1, . . . ) of UEs 11 performing measurements based on the first type of reference signals (e.g., if not present no need to adapt the second bandwidth to the first bandwidth);
- Presence in an area (e.g., cell, neighbor cells, tracking area, physical area, building, etc.) of at least number N (e.g., N=1, . . . ) of UEs 11 performing measurements based on the first and second types of reference signals (e.g., if not present no need to adapt the second bandwidth to the first bandwidth); and/or
- Presence in an area (e.g., cell, neighbor cells, tracking area, physical area, building, MBSFN area, etc.) of UE 11 receiving MBMS data.

In one example, BW2=f(BW1, . . . ), i.e., BW2 is a function of at least BW1, wherein the function may be, for example, a mathematical or logical function, e.g.: BW2=k*BW1. For example, the scaling factor k may be 1 or >1.

In yet another example, if the first type of reference signals is transmitted using different bandwidths, e.g., BW1_1 and BW1_2 on the same carrier, then the second bandwidth may be a function of at least two bandwidths used by the first type of reference signals (e.g., BW2=f(BW1_1, BW1_2, . . . ), where the function f( ) may be the maximum function.

In yet another example, BW2 may depend on the bandwidth of the first type of reference signals transmitted in a specific subset R1 of time resources, e.g., BW2=f(BW1, R1, . . . ).

In another example, BW2 may further depend on numerology of the first type of reference signals and/or numerology of the second type of reference signals, e.g., BW2=f (BW1, NUM1, NUM2, . . . ).

In another example, BW2 may be such that the difference between BW1 and BW2 is below a threshold, e.g., abs (BW1−BW2)<=threshold or BW1−BW2<=threshold or BW2−BW1<=threshold.

The obtaining may further comprise obtaining time and/or frequency resources in which the second obtained bandwidth is to be used, e.g.:

In all subframes of a carrier frequency on which the first and the second types of reference signals are transmitted; or In the subframes where the first type of reference signals is transmitted; or In MBSFN subframes with MBMS data or MCH transmitted, but not necessarily in MBSFN subframes without MBMS data or MCH; or In time resources used for positioning (e.g., PRS or positioning subframes).

Step 4

In this step, the controlling node 12 may control the bandwidth of the second type of reference radio signals, based on the obtained second bandwidth configuration (e.g., BW2) (block S108).

The controlling may further comprise configuring the bandwidth of the second type of reference signals to BW2 in a subset of resources in which the obtained BW2 is to be applied.

The controlling may further comprise sending a command to increase/decrease the bandwidth of the second type of the reference signals and/or sending the new bandwidth configuration to the node(s) transmitting the second type of reference signals (e.g., in some examples the controlling node 12 may not necessarily transmit by itself the second type of reference signals).

One or more rules can be defined. The UE 11 may meet one or more requirements related to the measurements which use at least CRS provided that one or more rules are applied by the radio node which transmits CRS. Examples of rules which can be pre-defined or configured by the controlling nodes 12 are:

If the first reference signal (RS1) and second reference signal (RS2) are transmitted in at least part of the same time resource then the first BW (BW1) of RS1 and the second bandwidth (BW2) of RS2 are related by a relation or a function. Examples of relation are Equal, Larger than, or less than. For example, BW2 is equal to BW1 if RS1 and RS2 are transmitted in the same subframe regardless of BW2 in other subframes.

In MBSFN subframe, the BW of the CRS in symbol #0 is the same as or not smaller than the bandwidth of MBSFN RS.

In MBSFN subframe, the BW of the CRS in symbol #0 is equal to or not smaller than the BW of the cell transmitting the MBSFN subframe regardless of the CRS BW in any non-MBSFN subframe in that cell.

In PRS subframe in a cell the BW of CRS is the same as the bandwidth of PRS.

In PRS subframe in a cell the BW of CRS is the same as or not smaller than the bandwidth of PRS regardless of the CRS BW in any non-PRS subframe in that cell.

The UE 11 shall meet one or more measurement requirements (e.g., measurement period, measurement accuracy, cell identification time, etc.) provided that in the MBSFN subframe of a measured cell the BW of the CRS in symbol #0 is equal to or not smaller than the BW of the measured cell.

The UE 11 shall meet one or more measurement requirements (e.g., measurement period, measurement accuracy, cell identification time, etc.) related to RSTD provided that in the PRS subframe of a measured cell the BW of the CRS in all the symbols containing CRS is equal to or not smaller than the PRS BW in the measured cell.

Step 5

In this step, the controlling node 12 may inform at least one other node (e.g., UE 11 or another network node) about the obtained second bandwidth configuration (block S110).

The informing may comprise, for example, informing the at least one other node that the bandwidth has been changed and/or sending the new bandwidth BW2 to the at least one other node.

The informing may also happen selectively, such as, for example, upon a request from another node, upon a condition, or upon changing the bandwidth of the second type of reference signals.

The informing may also comprise triggering one or more corresponding actions (e.g., configure measurement configuration or receiver accordingly, configure transmission configuration of second type of reference signals accordingly, adapting measurement bandwidth, etc.) in the receiving node.

The informing may be via radio or other interface, via higher-layer signaling or physical layer signaling (e.g., control channel), via unicast/multicast/broadcast, etc.

Having described some embodiments for a controlling node 12, a more detailed description of embodiments associated with methods for a measuring node 11 according to a second aspect of the present disclosure will be described.

Figure 9:
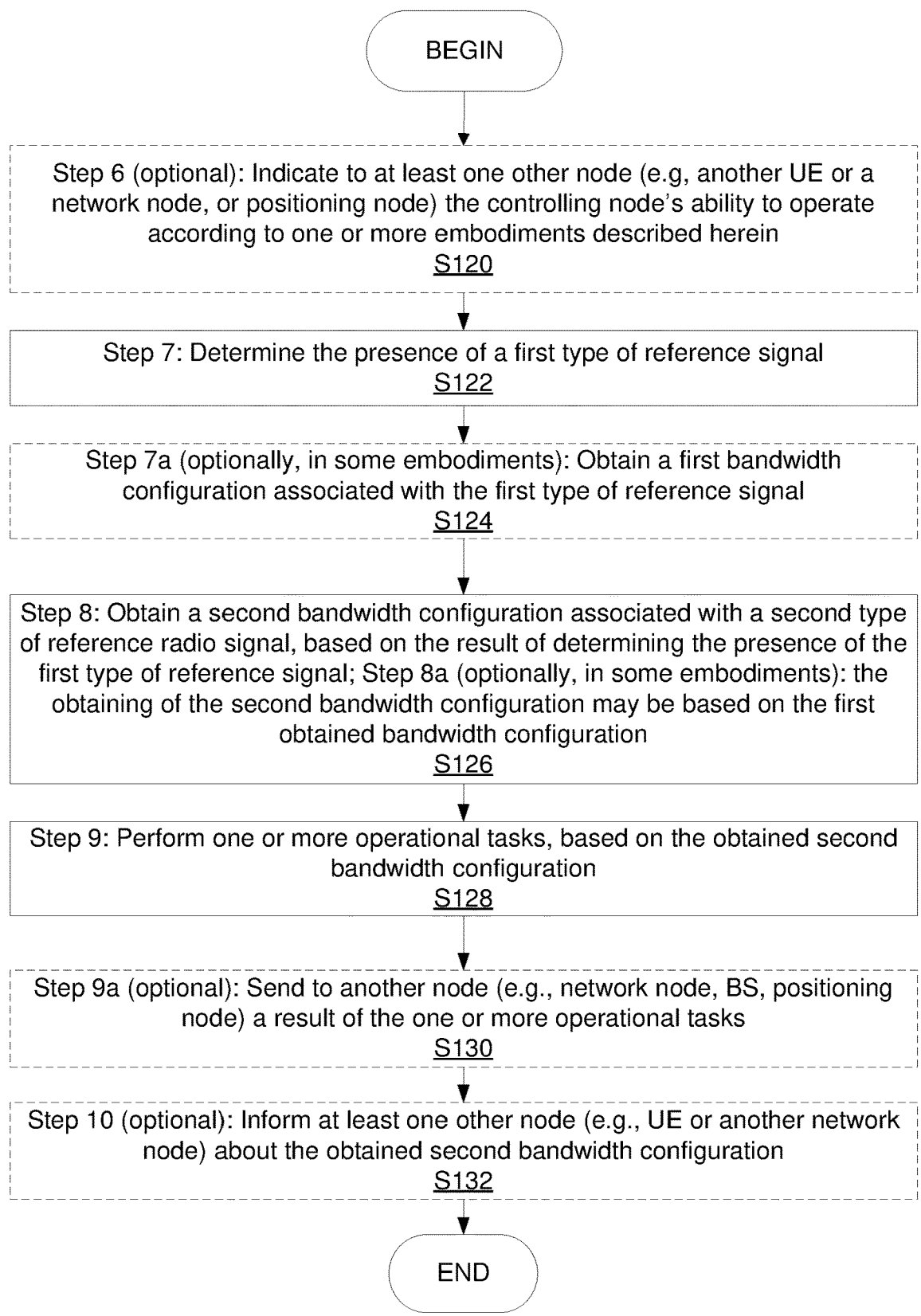
FIG. 9 is a flowchart illustrating an exemplary method for a measuring node according to embodiments of the present disclosure.

Examples of embodiments of methods for a measuring node 11 (e.g., UE or a radio network node, etc.) according to certain embodiments of a second aspect of the disclosure are illustrated in FIG. 9.

Referring now primarily to FIG. 9, examples of embodiments of such methods may comprise:

Step 6 (optional): Indicating to at least one other node (e.g., another UE or a network node, positioning node) the measuring node's 11 ability to operate according to one or more embodiments described herein (block S120);

Step 7: Determining the presence of the first type of reference signals (block S122);

Step 7a (in some embodiments): Obtaining a first bandwidth configuration associated with a first type of reference radio signals (block S124);

Step 8: Obtaining a second bandwidth configuration associated with a second type of reference radio signals, based on the result of determining of presence of the first type of reference signals (block S126);

Step 8a (in some embodiments): The obtaining of the second bandwidth configuration may be based on the first obtained bandwidth configuration;

Step 9: Performing one or more operational tasks, based on the obtained second bandwidth configuration (block S128);

Step 9*a* (optional): Sending to another node (e.g., network node 12, BS, positioning node) a result of the one or more operational tasks (block S130); and Step 10 (optional): Informing at least one other node (e.g., UE or another network node) about the obtained second bandwidth configuration (block S132).

Additional details on the above steps, according to various embodiments are presented next:

Step 6

In this step, the measuring node 11 may indicate to at least one other node (e.g., another UE or a network node, positioning node) the measuring node's 11 ability to operate according to one or more embodiments described herein (block S120).

In one further example, the indication may at least an indication of the measuring node's 11 ability to correctly determine the second bandwidth configuration (e.g., transmission bandwidth for CRS or measurement bandwidth for CRS based measurement), while meeting one or more performance requirements or targets (e.g., measurement accuracy, measurement time, measurement delay, measurement reporting delay, etc.).

The indication may be via higher-layer signaling (e.g., RRC or LPP) and/or physical layer signaling (e.g., PUCCH). The indication may be via dedicated channel, multi-cast, or broadcast.

The indication may be sent upon a request from another node or in an unsolicited way, upon a triggering condition or event.

Step 7

In this step, the measuring node 11 may determine the presence of the first type of reference signals (block S122).

Methods and principles/rules of determining may be similar to those described in connection to methods for a controlling node, according to a first aspect of the disclosure. In one further example, the determining may be on the signaling received from another node, e.g., BS or positioning node.

In some embodiments, the measuring node 11 may obtain a first bandwidth configuration associated with a first type of reference radio signals (block S124).

Methods and principles/rules of obtaining may be similar to those described in connection to methods for a controlling node 12, according to a first aspect of the disclosure. In one example, the methods may be based on pre-defined rules.

The presence and/or the first bandwidth may also be determined by the UE based on measurements, e.g., blindly, semi-blindly, by verifying two or more hypotheses, etc.

Step 8

In this step, the measuring node 11 may obtain a second bandwidth configuration associated with a second type of reference radio signals, based on the result of determining of presence of the first type of reference signals (block S126).

Methods and principles/rules of obtaining may be similar to those described in connection to methods for a controlling node 12, according to a first aspect of the disclosure.

In some embodiments, the obtaining of the second bandwidth configuration may be based on the first obtained bandwidth configuration, which may correspond to Step 8*a*. Methods and principles/rules of obtaining may be similar to those described in connection to methods for a controlling node 12, according to a first aspect of the disclosure.

The second bandwidth may also be determined by the UE 11 based on measurements, e.g., blindly, semi-blindly, by verifying two or more hypotheses, etc. The hypotheses may be determined based on the result(s) of Step 7.

Step 9

In this step, the measuring node 11 may perform one or more operational tasks, based on the obtained second bandwidth configuration (block S128).

Examples of the operational tasks include: radio measurements, e.g., positioning measurements, E-CID measurements, OTDOA measurements, RSTD measurements, MBSFN measurements, MDT measurements, etc.

In some embodiments, the measuring node 11 may send to another node (e.g., network node, BS, positioning node or another UE) a result of the one or more operational tasks (block S130), which may correspond to Step 9*a*.

Step 10

In this step, the measuring node 11 may inform at least one other node (e.g., UE or another network node) about the obtained second bandwidth configuration (block S132). The information may be comprised, in one example, in a measurement report (e.g., for the measurements performed on the first type of radio signals and/or second type of radio signals). In a further example, the measuring node 11 may include the obtained second bandwidth or the measurement bandwidth for the measurements performed based on at least second type of radio signals.

According to an aspect of the present disclosure, a method for a controlling node 12*a* includes determining a presence of a first type of reference signal having a first bandwidth configuration (block S102); obtaining a second bandwidth configuration associated with a second type of reference signal, the second bandwidth configuration being based on the presence of the first type of reference signal (block S106); and controlling a bandwidth of the second type of reference signal based on the obtained second bandwidth configuration (block S108).

According to this aspect, in some embodiments, the first type of reference signal is of reference signal type that is different from the second type of reference signal. In some embodiments, controlling the bandwidth of the second type of reference signal comprises informing at least one other node 11, 12*b* of the obtained second bandwidth configuration associated with the second type of reference signal (block S110). In some embodiments, the obtained second bandwidth configuration is based on the first bandwidth configuration. In some embodiments, obtaining a second bandwidth configuration comprises using a first bandwidth value for the second type of reference signal if the presence of the first type of reference signal is not detected and, as a result of detecting the presence of the first type of reference signal, using a second bandwidth value for the second type of reference signal, the second bandwidth value being different from the first bandwidth value. In some embodiments, controlling the bandwidth of the second type of reference signal based on the obtained second bandwidth configuration comprises configuring the bandwidth of the second type of reference signal based on a bandwidth of the first type of reference signal as a result of the first type of reference signal and the second type of reference signal being configured for transmission in at least part of the same time resource. In some embodiments, the method further comprises at least one of: indicating to at least one other node 11, 12*b* the controlling node's ability to control the bandwidth of the second type of reference signal based on the presence of the first type of reference signal (block S100); and obtaining the first bandwidth configuration of the first type of reference signal (block S104). In some embodiments, the controlling node 12*a* is one of a base station and a positioning node. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a method for a measuring node 11a includes determining a presence of a first type of reference signal having a first bandwidth configuration (block S122); obtaining a second bandwidth configuration associated with a second type of reference signal, the second bandwidth configuration being based on the presence of the first type of reference signal (block S126); and performing at least one operational task based on the obtained second bandwidth configuration (block S128).

According to this aspect, in some embodiments, the first type of reference signal is of reference signal type that is different from the second type of reference signal. In some embodiments, the method includes performing at least one operational task comprises measuring at least one of the first type of reference signal and the second type of reference signal. In some embodiments, the obtained second bandwidth configuration is based on the first bandwidth configuration. In some embodiments, the obtained second bandwidth configuration uses a first bandwidth value for the second type of reference signal if the presence of the first type of reference signal is not detected and uses a second bandwidth value for the second type of reference signal if the presence of the first type of reference signal is detected, the second bandwidth value being different from the first bandwidth value. In some embodiments, the method further includes at least one of: indicating to at least one other node 12, 11b the measuring node's ability to obtain the second bandwidth configuration and perform the at least one operational task based on the obtained second bandwidth configuration (block S120); obtaining the first bandwidth configuration of the first type of reference signal (block S124); sending a result of the performance of the at least one operational task to at least one other node 12, 11b (block S130); and informing at least one other node 12, 11b of the obtained second bandwidth configuration (block S132). In some embodiments, the measuring node 11a is a user equipment. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a controlling node 12a includes circuitry, the circuitry configured to: determine a presence of a first type of reference signal having a first bandwidth configuration; obtain a second bandwidth configuration associated with a second type of reference signal, the second bandwidth configuration being based on the presence of the first type of reference signal; and control a bandwidth of the second type of reference signal based on the obtained second bandwidth configuration.

According to this aspect, in some embodiments, the first type of reference signal is of reference signal type that is different from the second type of reference signal. In some embodiments, the circuitry is further configured to control the bandwidth of the second type of reference signal by informing at least one other node 11, 12b of the obtained second bandwidth configuration associated with the second type of reference signal. In some embodiments, the obtained second bandwidth configuration is based on the first bandwidth configuration. In some embodiments, the circuitry is further configured to obtain a second bandwidth configuration by using a first bandwidth value for the second type of reference signal if the presence of the first type of reference signal is not detected and, as a result of detecting the presence of the first type of reference signal, using a second bandwidth value for the second type of reference signal, the second bandwidth value being different from the first bandwidth value. In some embodiments, wherein the circuitry is further configured to control the bandwidth of the second type of reference signal by configuring the bandwidth of the second type of reference signal based on a bandwidth of the first type of reference signal as a result of the first type of reference signal and the second type of reference signal being configured for transmission in at least part of the same time resource. In some embodiments, the circuitry is further configured to at least one of: indicate to at least one other node 11, 12b the controlling node's 12a ability to control the bandwidth of the second type of reference signal based on the presence of the first type of reference signal; and obtain the first bandwidth configuration of the first type of reference signal. In some embodiments, the controlling node 12a is one of a base station and a positioning node. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a measuring node 11a, includes circuitry, the circuitry configured to: determine a presence of a first type of reference signal having a first bandwidth configuration; obtain a second bandwidth configuration associated with a second type of reference signal, the second bandwidth configuration being based on the presence of the first type of reference signal; and perform at least one operational task based on the obtained second bandwidth configuration.

According to this aspect, in some embodiments, the first type of reference signal is of reference signal type that is different from the second type of reference signal. In some embodiments, the circuitry is further configured to perform at least one operational task by, for example, measuring at least one of the first type of reference signal and the second type of reference signal. In some embodiments, the obtained second bandwidth configuration is based on the first bandwidth configuration. In some embodiments, the obtained second bandwidth configuration uses a first bandwidth value for the second type of reference signal if the presence of the first type of reference signal is not detected and uses a second bandwidth value for the second type of reference signal if the presence of the first type of reference signal is detected, the second bandwidth value being different from the first bandwidth value. In some embodiments, the circuitry is further configured to at least one of: indicate to at least one other node 12, 11b the measuring node's 11a ability to obtain the second bandwidth configuration and perform the at least one operational task based on the obtained second bandwidth configuration; obtain the first bandwidth configuration of the first type of reference signal; send a result of the performance of the at least one operational task to at least one other node 12, 11b; and inform at least one other node 12, 11b of the obtained second bandwidth configuration. In some embodiments, the measuring node 11a is a user equipment. In some embodiments, the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

According to another aspect of the present disclosure, a controlling node 12, includes a determining module 40 configured to determine a presence of a first type of reference signal having a first bandwidth configuration; an obtaining module 42 configured to obtain a second bandwidth configuration associated with a second type of reference signal, the second bandwidth configuration being based on the presence of the first type of reference signal; and a controlling module 44 configured to control a bandwidth of the second type of reference signal based on the obtained second bandwidth configuration.

According to yet another aspect of the present disclosure, a measuring node 11 includes a determining module 50 configured to determine a presence of a first type of reference signal having a first bandwidth configuration; an obtaining module 52 configured to obtain a second bandwidth configuration associated with a second type of reference signal, the second bandwidth configuration being based on the presence of the first type of reference signal; and a performing module 54 configured to perform at least one operational task based on the obtained second bandwidth configuration.

Any two or more embodiments described in this document may be combined in any way with each other. Furthermore, the described embodiments are not limited to the described radio access technologies (e.g., LTE, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. In some embodiments, some steps may be performed concurrently with one another. In some embodiments, some steps listed as separate steps may be implementations of a separately listed step. In yet other embodiments, some steps described as an implementation of one step may in some embodiments be a separate step. Generally, all terms used in the disclosure are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

3GPP specifications, such as Rxxxx documents and TSxxx documents are publicly available at http://www.3gpp.org.

At least some of the following abbreviations may be used in this disclosure.
1×RTT CDMA2000 1× Radio Transmission Technology
3GPP Third Generation Partnership Project
ABS Almost Blank Subframe
ARQ Automatic Repeat Request
AWGN Additive White Gaussian Noise
BCCH Broadcast Control Channel
BCH Broadcast Channel
BS Base Station
BW Bandwidth
CA Carrier Aggregation
CC Carrier Component
CCCH SDU Common Control Channel SDU
CDMA Code Division Multiplexing Access
CGI Cell Global Identifier
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RSRP Reference symbol received power using CSI reference symbols
DCCH Dedicated Control Channel
DL Downlink
DRS Discovery Signal
DRX Discontinuous Reception
DTX Discontinuous Transmission
DTCH Dedicated Traffic Channel
DUT Device Under Test
DwPTS Downlink Pilot Time Slot
E-CID Enhanced Cell-ID (positioning method)
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
GERAN GSM EDGE Radio Access Network
gNB Next Generation eNB
GP Guard Period
GSM Global System for Mobile communication
HARQ Hybrid Automatic Repeat Request
HO Handover
HSPA High Speed Packet Access
HRPD High Rate Packet Data
ID Identifier
LAA License assisted access
LBT Listen before talk
LPP LTE Positioning Protocol
LPPe LPP Extension
LPPa LPP A
LTE Long-Term Evolution
MAC Medium Access Control
MBMS Multimedia Broadcast Multicast Services MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PUCCH Physical Uplink Control Channel
PUSCH Physical Uplink Shared Channel
RAT Radio Access Technology
RB Resource Block
RF Radio Frequency
RLM Radio Link Management
RRC Radio Resource Control
RSCP Received Signal Code Power
RSRP Reference Symbol Received Power
RSRQ Reference Symbol Received Quality
RSSI Received Signal Strength Indicator
RSTD Reference Signal Time Difference
RTT Round Trip Time
Rx Receive
QAM Quadrature Amplitude Modulation
RACH Random Access Channel
RAT Radio Access Technology
RNC Radio Network Controller
RNTI Radio Network Temporary Identifier
RRC Radio Resource Control
RRM Radio Resource Management
SCH Synchronization Channel
SCell Secondary Cell
SDU Service Data Unit
SFN System Frame Number
SGW Serving Gateway
SI System Information
SIB System Information Block
SINR Signal to Interference plus Noise Ratio
SNR Signal to Noise Ratio
SON Self Optimized Network
TDD Time Division Duplex
TA Timing Advance
TDM Time Division Multiplexing
TOA Time Of Arrival
TTI Transmission Time Interval
Tx Transmit
UE User Equipment
UL Uplink
UMTS Universal Mobile Telecommunication System
UpPTS Uplink Pilot Time Slot
UTRA Universal Terrestrial Radio Access
UTRAN Universal Terrestrial Radio Access Network
WCDMA Wide CDMA
WLAN Wide Local Area Network As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects, which may generally be referred to herein as a "circuit" or "module" in some embodiments. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a controlling node, the method comprising:
    determining a presence of a first type of reference signal having a first bandwidth configuration;
    obtaining a second bandwidth configuration associated with a second type of reference signal, the first type of reference signal being a reference signal type that is different from the second type of reference signal, the first type of reference signal and the second type of reference signal being in a same time resource, and the second bandwidth configuration being based on the presence of the first type of reference signal; and
    controlling a bandwidth of the second type of reference signal in the same time resource as the first type of reference signal based on the obtained second bandwidth configuration.

2. The method according to claim 1, wherein controlling the bandwidth of the second type of reference signal comprises informing at least one other node of the obtained second bandwidth configuration associated with the second type of reference signal.

3. The method according to claim 1, wherein the obtained second bandwidth configuration is based on the first bandwidth configuration.

4. The method according to claim 1, further comprising:
    using a first bandwidth value for the second type of reference signal if a presence of the first type of reference signal is not detected; and
    wherein obtaining a second bandwidth configuration comprises as a result of detecting the presence of the first type of reference signal, using a second bandwidth value for the second type of reference signal, the second bandwidth value being different from the first bandwidth value.

5. The method according to claim 1, wherein controlling the bandwidth of the second type of reference signal based on the obtained second bandwidth configuration comprises configuring the bandwidth of the second type of reference signal based on a bandwidth of the first type of reference signal as a result of the first type of reference signal and the second type of reference signal being configured for transmission in at least part of the same time resource.

6. The method according to claim 1, further comprising at least one of:
    indicating to at least one other node the controlling node's ability to control the bandwidth of the second type of reference signal based on the presence of the first type of reference signal; and
    obtaining the first bandwidth configuration of the first type of reference signal.

7. The method according to claim 1, wherein the controlling node is one of a base station and a positioning node.

8. The method according to claim 1, wherein the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

9. A controlling node, the controlling node comprising:
    circuitry, the circuitry configured to:
    determine a presence of a first type of reference signal having a first bandwidth configuration;
    obtain a second bandwidth configuration associated with a second type of reference signal, the first type of reference signal being a reference signal type that is different from the second type of reference signal, the first type of reference signal and the second type of reference signal being in a same time resource, and the second bandwidth configuration being based on the presence of the first type of reference signal; and
    control a bandwidth of the second type of reference signal in the same time resource as the first type of reference signal based on the obtained second bandwidth configuration.

10. The controlling node according to claim 9, wherein the circuitry is further configured to control the bandwidth of the second type of reference signal by informing at least one other node of the obtained second bandwidth configuration associated with the second type of reference signal.

11. The controlling node according to claim 9, wherein the obtained second bandwidth configuration is based on the first bandwidth configuration.

12. The controlling node according to claim 9, further comprising:
    using a first bandwidth value for the second type of reference signal if a presence of the first type of reference signal is not detected; and
    wherein the circuitry is further configured to obtain a second bandwidth configuration as a result of detecting the presence of the first type of reference signal, using a second bandwidth value for the second type of reference signal, the second bandwidth value being different from the first bandwidth value.

13. The controlling node according to claim 9, wherein the circuitry is further configured to control the bandwidth of the second type of reference signal by configuring the bandwidth of the second type of reference signal based on a bandwidth of the first type of reference signal as a result of the first type of reference signal and the second type of reference signal being configured for transmission in at least part of the same time resource.

14. The controlling node according to claim 9, wherein the circuitry is further configured to at least one of:
   indicate to at least one other node the controlling node's ability to control the bandwidth of the second type of reference signal based on the presence of the first type of reference signal; and
   obtain the first bandwidth configuration of the first type of reference signal.

15. The controlling node according to claim 9, wherein the controlling node is one of a base station and a positioning node.

16. The controlling node according to claim 9, wherein the first type of reference signal is one of: a positioning reference signal, PRS, a multi-broadcast single frequency network, MBSFN, reference signal, a channel state information reference signal, CSI-RS, and a demodulation reference signal, DMRS; and the second reference signal is a cell-specific reference signal, CRS.

* * * * *